(12) United States Patent
Komorita et al.

(10) Patent No.: US 6,485,830 B1
(45) Date of Patent: Nov. 26, 2002

(54) MATERIAL FOR CERAMIC BALL AND METHOD OF MANUFACTURING CERAMIC BALL

(75) Inventors: Hiroshi Komorita, Kanagawa-ken (JP); Minoru Takao, Kanagawa-ken (JP); Isao Ikeda, Kanagawa-ken (JP); Hiroki Tonai, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 108 days.

(21) Appl. No.: 09/669,895

(22) Filed: Sep. 27, 2000

(30) Foreign Application Priority Data

Sep. 30, 1999 (JP) .............................. 11-280575

(51) Int. Cl.$^7$ ................................. B32B 5/16
(52) U.S. Cl. ...................... 428/402; 428/404; 428/406; 427/427; 501/92; 501/97
(58) Field of Search ................. 428/402, 404, 428/406; 427/427; 501/92, 97

(56) References Cited

U.S. PATENT DOCUMENTS 6,284,694 B1 * 9/2001 Moeltgen et al. ........... 501/127

FOREIGN PATENT DOCUMENTS

JP 63-057204 * 3/1988
JP 2-214606 * 8/1990

* cited by examiner

Primary Examiner—Leszek Kiliman
(74) Attorney, Agent, or Firm—Foley & Lardner

(57) ABSTRACT

In material for ceramic ball that has a spherical portion of approximate sphere at both ends thereof and a belt-like portion at a center thereof over an entire circumferential direction, a difference between a diagonal diameter of the belt-like portion and a polar diameter of the spherical portion is 100 μm or less. A height of the belt-like portion from the spherical portion is preferable to be 1 mm or less. A width of the belt-like portion is preferable to be 5 mm or less. The material for ceramic ball can be used for material for bearing balls for instance. When applying in such a usage, the material for ceramic ball essentially consists of silicon nitride, Vickers hardness thereof being preferable to be 1400 or more. In the material for ceramic ball of the present invention, a difference between a diagonal diameter of a belt-like portion and a polar diameter of a spherical portion is set at 100 μm or less. As a result, the material is formed in a shape where the belt-like portion does not project from the spherical portion. Thereby, the belt-like portion of the material for ceramic ball and polar diameter of the spherical portion come into average contact with abrasives or the like. Accordingly, different from the case of the existing material, the belt-like portion can be suppressed from wearing and damaging the abrasives due to the contact.

17 Claims, 2 Drawing Sheets

MATERIAL FOR CERAMIC BALL AND METHOD OF MANUFACTURING CERAMIC BALL

BACKGROUND OF THE INVENTION

1. Field of the Invention

The present invention relates to material for ceramic ball that is used for manufacturing for instance a bearing and a method of manufacturing a ceramic ball.

2. Description of the Related Art

A ceramic ball is used for a bearing or the like. Being used in a rotating state, the ceramic ball is important to be even in its surface and to be close to a complete sphere in its shape.

Usually, the ceramic balls are manufactured in the following ways. Raw material powders of various kinds of ceramics such as silicon nitride and zirconium oxide are mixed and milled together with sintered additives and additives, followed by granulating in terms of a spray-dryer or the like. The granulated powder is press molded into molded bodies of spherical shape, further the molded bodies being sintered to form material for ceramic ball, as demands arise surface finishing being applied to manufacture the ceramic balls.

In the case of the existing material for ceramic ball, as shown in FIG. 3, first, powder is input into a space between an upper die 6 and a lower die 7, followed by compressing the upper and lower dies 6 and 7. Thereby, the powder is press molded into a molded body. Then, the molded body is sintered to obtain material for ceramic ball.

However, when manufacturing a bearing ball in terms of the press molding like this, in order to protect the dies, between an end portion 8 of the upper die 6 and an end portion 9 of the lower die 7 a gap must be disposed to perform press molding.

Accordingly, during press molding, the powder enters into the gap between the end portions 8 and 9 of the dies. As a result, as shown in FIG. 4, along a perimeter of the material 1 for ceramic ball, a belt-like portion 3 is formed in ring. It is usual to remove the belt-like portion 3 by polishing or mirror polishing. In order not to form the belt-like portion 3, it is considered to press the upper and lower dies to come into contact, but due to applied pressure the dies may crack or tip to result in consuming rapidly the dies.

In the existing material for ceramic ball, due to formation of the belt-like portion 3 along the perimeter of the complete sphere, it has a shape in which the belt-like portion 3 is projected from a ball. The projected portion, during polishing, comes into contact with abrasives, abrasive grain or the like to wear and damage these.

That is, as shown in FIG. 4, because a diagonal diameter R1 of the belt-like portion is usually longer than a polar diameter R2 of the spherical portion, the belt-like portion mainly comes into contact with abrasives, abrasive grain or the like to wear these.

As hardness of ceramics become higher, wear of the abrasives due to the belt-like portion on the surface of the material for ceramic ball like this becomes larger. Accordingly, members such as abrasives, abrasive grains or the like used in polishing or mirror polishing cannot be used for long.

In particular, in one of which hardness is high like silicon nitride and diameter is small, an influence of the belt-like portion on the abrasives becomes further conspicuous, resulting in even an economical problem.

Japanese Patent Laid-open Application No. SHO 63-57204 discloses a method of manufacturing a spherical body where, before sintering, chamfering is applied to a cylindrical powder molded body. In this method, in a state where the powder molded body is easy to shape, the chamfering is applied to shape into a nearly final shape. Accordingly, the processing after the sintering can be made scarce. However, the powder molded body, being very low in its hardness, tends to become damaged during the processing. In addition, whereas due to a shorter polishing time after the sintering the influence on the abrasives or the like can be lessened, a step of shaping the powder molded body is additionally required. As a result, a remarkable improvement in manufacturing efficiency cannot be expected.

Japanese Patent Laid-open Application No. HEI 2-214606 discloses that a length of a non-spherical portion sandwiched between spherical portions at both ends of a molded body is made 50 to 90% of a distance between apexes of the spherical portions, thereby a density distribution of the sphere can be made constant. However, even in the above method, the belt-like portion is not yet avoided to form, and, during polishing, the belt-like portion promotes the consumption of the abrasives.

From the above, material for ceramic ball that does not require a new step of manufacturing such as that of the processing after molding and can suppress the consumption of the abrasives in the processing after sintering is demanded.

SUMMARY OF THE INVENTION

An object of the present invention is to provide material for bearing ball. The material can be processed more easily than the existing material for ceramic ball can. The material enables to suppress wear and damage against abrasives or the like used in surface finishing the material for ceramic ball.

Another object of the present invention is to provide a method of efficiently manufacturing a ceramic ball while suppressing wear and damage of abrasives or the like.

The material for ceramic ball of the present invention, at both ends of which has spherical portions of approximate sphere and, at the center of which has a belt-like portion over an entire circumferential direction. In the material, a difference between a diagonal diameter of the belt-like portion and a polar diameter of the spherical portions is characterized to be 100 $\mu$m or less.

In the present material for ceramic ball, a height of the belt-like portion from the spherical portion is preferable to be 1 mm or less.

In the present material for ceramic ball, a width of the belt-like portion is preferable to be 5 mm or less.

The material for ceramic ball of the present invention like this can be used for material for bearing ball for instance. When using in such an application, one essentially consisting of silicon nitride is preferable. Further, when using as material for bearing ball for instance, hardness of the present material for ceramic ball is preferable to be 1400 or more in terms of Vickers hardness.

The present method of manufacturing a ceramic ball comprises a step of press molding and sintering, and a step of polishing the material for ceramic ball. In the step of press molding and sintering, first the powder essentially consisting of silicon nitride is molded into a shape that has spherical portions of approximate sphere at both ends and a belt-like portion formed over an entire circumferential direction at the center portion. Thereafter, the molded powder is sintered to manufacture material for ceramic ball.

In the present material for ceramic ball, the difference between a diagonal diameter of the belt-like portion and the polar diameter of the spherical portion is set at 100 μm or less. Thereby, the belt-like portion is suppressed from projecting from the spherical portion. By forming into such shape, the belt-like portion of the material for ceramic ball and the polar portions of the spherical portions come into average contact with the abrasives or the like. Accordingly, different from the case of the existing material, the wear and damage of the abrasives due to the contact with the belt-like portion can be suppressed.

Further, in the present material for ceramic ball, a height of the belt-like portion from the spherical portion is set at 1 mm or less. Thereby, during the polishing, the wear of the abrasives during the polishing can be suppressed.

Still further, in the present material for ceramic ball, a width of the belt-like portion is set at 5 mm or less. Thereby, the wear of the abrasives during the polishing can be further suppressed.

Further, the present material for ceramic ball can be used as material for bearing ball. Thereby, the bearing balls excellent in rolling life or the like can be easily manufactured.

The present material for ceramic ball can essentially consist of silicon nitride. Thereby, the bearing ball having excellent mechanical strength such as Vickers hardness of for instance 1400 or more and excellent in the rolling life or the like can be manufactured.

Still further, by use of the present method of manufacturing ceramic balls, the ceramic balls of excellent mechanical strength can be efficiently manufactured without unnecessarily damaging the abrasives or the like.

DESCRIPTION OF THE PREFERRED EMBODIMENTS

In the following, modes for implementing the present invention will be explained.

Figure 1:
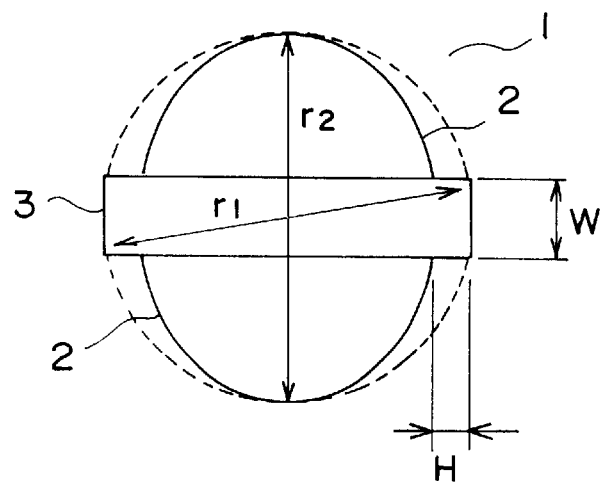
FIG. 1 is a schematic diagram showing one example of material for ceramic ball of the present invention.

In FIG. 1, the material 1 for ceramic ball of the present invention is schematically shown.

The material for ceramic ball of the present invention comprises spherical portions 2 of approximate sphere at both ends and a belt-like portion 3 formed at the center thereof over an entire circumferential direction. In addition, a difference between a diagonal diameter of the belt-like portion 3 and a polar diameter of the spherical portion 2 is 100 μm or less.

In FIG. 1, r1 denotes a diagonal diameter of the belt-like portion 3 and r2 denotes a polar diameter of a spherical portion of approximate sphere. When there being a taper on the belt-like portion, r1 denotes the longest diagonal when the diagonal is drawn on the section.

That is, in the present material for ceramic ball, $|r1-r2| \leq 100$ μm.

Thus, by forming the spherical portion 2 not into a complete sphere but into an approximate sphere, and by making the difference between the diagonal diameter of the belt-like portion 3 and the polar diameter of the spherical portion 2 100 μm or less, only the belt-like portion coming into contact with the abrasives or the like can be suppressed. That is, since the entire material for ceramic ball is allowed to come into average contact with the abrasives or the like, the wear and damage of the abrasives or the like can be suppressed.

Accordingly, by manufacturing from such material for ceramic ball, the ceramic balls can lengthen life of the abrasives or the like and can be efficiently manufactured.

Further, in the present material for ceramic ball, the height of the belt-like portion 3 from the spherical portion 2 is set at 1 mm or less. Thereby, only the belt-like portion 3 coming into contact with the abrasives or the like can be suppressed, resulting in suppressing the wear and damage of the abrasives or the like. In FIG. 1, H denotes the height of the belt-like portion 3 from the spherical portion 2.

Figure 3:
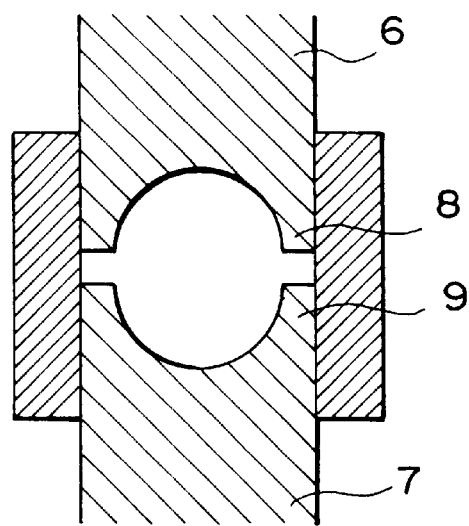
FIG. 3 is a sectional view showing general dies.

Further, in the present material for ceramic ball, the width of the belt-like portion 3 is set at 5 mm or less. Thereby, the wear and damage of the abrasives or the like can be further suppressed. When the width of the belt-like portion 3 is too broad, the belt-like portion 3 mainly comes into contact with the abrasives or the like, resulting in wearing and damaging the abrasives or the like. In FIG. 3, W denotes the width of the belt-like portion 3.

The material for ceramic ball of the present invention is preferable to consist essentially of silicon nitride. By constituting the material for ceramic ball of silicon nitride, the ceramic balls of excellent mechanical strength and corrosion resistance can be manufactured.

As a method of polishing the ceramic balls, various kinds of processing methods such as lapping or the like can be used. Further, in the polishing such as the lapping or the like, abrasive grains of various coarseness (numbers) can be used. In the case of the ceramic ball, the abrasive grain of around No. #80 to #600 can be preferably used.

In the existing method, one made of silicon nitride, being high in hardness, tends to wear and damage the abrasives or the like. In particular, in one that is manufactured by the press molding, due to the existence of the belt-like portion at a perimeter portion, the belt-like portion wears and damages the abrasives or the like. In the present material for ceramic ball, even when one that is excellent in hardness like this is used, the abrasives or the like can be suppressed from wearing and damaging, resulting in efficiently manufacturing the ceramic balls.

In the present invention, in order to further suppress the wear and damage of the abrasives or the like, when r1 is a diagonal diameter of the belt-like portion 3 and r2 is a polar diameter of the spherical portion 2 of approximate sphere, it is preferable to be $|r1-r2| \leq 60$ μm.

Further, when H is a height of the belt-like portion 3 from the spherical portion 2 and W is a width of the belt-like portion 3, it is preferable to be H ≦ 0.2 mm W ≦ 5 mm.

Further, the aforementioned W is preferable to be one half or less the r2, that is, to be a structure satisfying W ≦ r2/2.

Thereby, chance of the belt-like portion coming into contact with the abrasives or the like can be decreased, resulting in a further decrease of the wear and damage of the abrasives or the like.

Further, the wear and damage of the abrasives or the like due to the contact with the belt-like portion such as mentioned above become conspicuous as the ceramic balls become smaller. In specific, when the diagonal diameter r1 of the belt-like portion 3 of the material for ceramic ball and the polar diameter r2 of the spherical portion 2 of approximate sphere are 10 mm or less, these problems occur remarkably.

Accordingly, the present material for ceramic ball, when applying in one of which diagonal diameter r1 of the belt-like portion 3 or polar diameter r2 of the spherical portion 2 of approximate sphere is 10 mm or less, is particularly effective.

Next, a preparative example of the present material for ceramic ball will be shown.

To silicon nitride that is raw material, appropriate amounts of sintered additive, additive, solvent and binder are added to mix, followed by milling, thereafter being granulated by use of a spray dryer.

Figure 2:
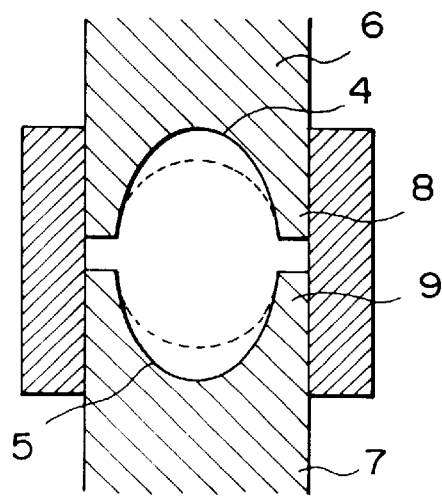
FIG. 2 is a sectional view showing one example of dies used for manufacturing material for ceramic ball of the present invention.

Thus prepared powder is press molded in terms of dies 6 and 7 having concave portions 4 and 5 of approximate sphere as shown in for instance FIG. 2 and is further sintered to manufacture. The diagonal diameter r1 of the belt-like portion of the material for ceramic ball or the polar diameter r2 of the spherical portion can be adjusted by varying the shape of the concave portions 4 and 5 of approximate sphere of the dies 6 and 7. As the shape of the concave portions 4 and 5, following one can be cited. That is, one that is obtained by elongating for instance a sphere in a certain axial direction, namely one in which a ratio of a certain polar diameter to a polar diameter perpendicular to a direction of the first polar diameter is different from 1 can be cited.

Further, the height H of the belt-like portion can be adjusted by varying thicknesses of tip ends 8 and 9 of the dies 6 and 7 in FIG. 2. Further, the width W can be adjusted by adjusting a distance between the tip ends 8 and 9 of the dies 6 and 7 in press molding.

Further, as a method of manufacturing a ceramic ball from the present material for ceramic ball, the following method can be cited. For instance the material for ceramic ball satisfying the aforementioned conditions is put into a gap between polishing plates disposed in parallel above and below. Due to movement of the polishing plates, the belt-like portion is removed from the material for ceramic ball to be processed into a sphere.

Embodiments

In the following, embodiments of material for ceramic all of the present invention will be explained. Embodiments 1 to 3, Comparative Examples 1 to 3

To silicon nitride that is raw material, sintered additive, additive, solvent and binder are added to mix, followed by milling and by granulating by use of a spray dryer.

Thus prepared powder is press molded, further degreased and sintered to manufacture materials for ceramic ball satisfying $$|r1-r2| \leq 100 \, \mu m$$

when the material for ceramic ball after sintering has a diagonal diameter r1 of the belt-like portion and a polar diameter r2 of the spherical portion of approximate sphere (hereinafter referred to as embodiments 1 to 3).

According to the similar method, as comparative examples, materials for ceramic ball which satisfy after sintering $$|r1-r2| > 100 \, \mu m$$

are manufactured (hereinafter referred to as Comparative Examples 1 to 3).

Figure 4:
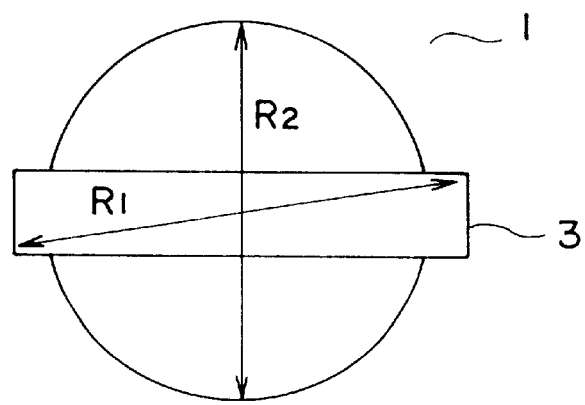
FIG. 4 is a schematic diagram showing existing material for ceramic ball.

Here, adjustment of $|r1-r2|$ is performed by varying the shape of the concave portions of approximate sphere in the dies as shown in FIG. 4 to press mold. Vickers hardness is 1500 for all.

With thus manufactured materials for ceramic ball of embodiments and comparative examples, an influence these materials for ceramic ball affecting on abrasive grain is evaluated.

When processing each material for ceramic ball with #180 abrasive grain, with 10,000 pieces of the present material for ceramic ball as one batch, how many batches the abrasive grain can endure is evaluated. Embodiment 1 and comparative example 1 are materials for finally obtaining ceramic balls of 5/16 inch, embodiment 2 and comparative example 2 materials for 3/8 inch, embodiment 3 and comparative example 3 materials for 1/2 inch.

Test results are shown in Table 1.

TABLE 1

|  | Material for ceramic ball | $|r1 - r2|$ ($\mu m$) | Endurance times of abrasive grain |
| --- | --- | --- | --- |
| Embodiment 1 | for 5/16 inch | 50 | 15 |
| Comparative example 1 | for 5/16 inch | 110 | 3 |
| Embodiment 2 | for 3/8 inch | 50 | 15 |
| Comparative example 2 | for 3/8 inch | 130 | 4 |
| Embodiment 3 | for 1/2 inch | 50 | 15 |
| Comparative example 3 | for 1/2 inch | 150 | 5 |

In the present embodiments where $|r1-r2| \leq 100 \, \mu m$, it is found that an amount of wear of the abrasive grain is a little, accordingly, in all embodiments, the abrasive grain can be used for a longer period of time.

On the contrary, in the comparative examples where $|r1-r2| > 100 \, \mu m$, it is found that the wear of the abrasive grain proceeds to result in all cases in endurance times of approximately one third those of embodiments 1 to 3.

From the above, by making the difference between the diagonal diameter of the belt-like portion and the polar diameter perpendicular to the belt-like portion 100 $\mu m$ or less, it is confirmed that the wear of the abrasive grain can be suppressed to result in lengthening the life of the abrasive grain.

Embodiments 4 and 5, Comparative Examples 4 and 5

To silicon nitride that is raw material, sintered additive, additive, solvent and binder are added to mix, followed by milling and by granulating by use of a spray dryer.

Thus prepared powder is press molded, further degreased and sintered to manufacture material for ceramic ball satisfying $$|r1-r2| \leq 100 \, \mu m$$

and having a height (H) of the belt-like portion from the spherical portion of 1 mm or less(hereinafter referred to as embodiments 4 and 5).

By use of the similar method, ones of which heights (H) of the belt-like portion from the spherical portion exceed 1.0 mm are manufactured (hereinafter referred to as Comparative Examples 4 and 5).

Here, adjustment of each portion is performed by varying the shapes of the concave portions of the dies and the thicknesses of the tip ends of the dies during press molding. Vickers hardness is 1500 for all.

With thus manufactured materials for ceramic ball of the embodiments and comparative examples, an influence these materials for ceramic ball affecting on abrasive grain is evaluated.

Similarly with embodiment 1, durability of the abrasive grain during lapping is investigated to evaluate. Embodiments 4 and 5 and comparative examples 4 and 5 are materials for finally obtaining ceramic balls of 5/16 inch.

Test results are shown in Table 2.

TABLE 2

|  | Material for ceramic ball | H (mm) | Endurance times of abrasive grain |
| --- | --- | --- | --- |
| Embodiment 4 | for 5/16 inch | 1 | 15 |
| Embodiment 5 | for 5/16 inch | 0.2 | 17 |
| Comparative Example 4 | for 5/16 inch | 1.5 | 7 |
| Comparative example 5 | for 5/16 inch | 2 | 3 |

As obvious from the results shown in Table 2, it is found that for ones of which height (H) of the belt-like portion from the spherical portion is 1 mm or less, the abrasive grain can endure the processing up to 15 times or more.

On the other hand, it is found that in comparative examples in which height of the belt-like portion from the spherical portion exceeds 1 mm, the abrasive grain can endure only 7 times of processing.

From the above, it is found that by making the height (H) of the belt-like portion from the spherical portion 1.0 mm or less, the abrasive grain can be suppressed from wearing, resulting in lengthening the life thereof.

Embodiments 6 and 7, Comparative Examples 6 and 7

To silicon nitride that is raw material, sintered additive, additive, solvent and binder are added to mix, followed by milling and by granulating by use of a spray dryer.

Thus prepared powder is press molded, further degreased and sintered to manufacture material for ceramic ball that after sintering satisfies $|r1-r2| \leq 100 \,\mu m$ and has a width (W) of the belt-like portion of 5 mm or less (hereinafter referred to as embodiments 6 and 7).

By use of the similar method, ones of which width (W) of the belt-like portion exceeds 5 mm are manufactured (hereinafter referred to as Comparative Examples 6 and 7).

Here, adjustment of each portion is performed by varying the shape of the concave portions of the dies and the distance between the dies during press molding. Vickers hardness is 1500 for all.

With thus manufactured materials for ceramic ball of present embodiments and comparative examples, an influence these materials for ceramic ball affecting on abrasive grain is evaluated.

Similarly with embodiment 1, durability of the abrasive grain during lapping is investigated to evaluate. Embodiments 6 and 7 and comparative examples 6 and 7 are materials for finally obtaining ceramic balls of 5/16 inch.

Test results are shown in Table 3.

TABLE 3

|  | Material for ceramic ball | W (mm) | Endurance times of abrasive grain |
| --- | --- | --- | --- |
| Embodiment 6 | for 5/16 inch | 5 | 10 |
| Embodiment 7 | for 5/16 inch | 3 | 14 |
| Comparative Example 6 | for 5/16 inch | 7 | 5 |
| Comparative example 7 | for 5/16 inch | 10 | 3 |

In the present embodiments where the width (W) of the belt-like portion is set 5 mm or less, it is found that the wear of the grindstone is a little and the grindstone can endure up to 10 times of processing.

On the other hand, it is found that in ones of which width (W) of the belt-like portion exceeds 5 mm, the abrasive grain wears much and can endure only up to 5 times of processing.

From the above, it is found that the width of the belt-like portion affects largely on the wear of the abrasives, in particular when the width of the belt-like portion exceeds 5 mm, the abrasive grain is conspicuously worn, resulting in remarkable shortening of the life thereof.

Embodiments 8 to 11, Comparative Examples 8 to 11

To silicon nitride that is raw material, sintered additive, additive, solvent and binder are added, mixed and milled, followed by granulation in terms of a spray dryer. Thus prepared powder is press molded, followed by degreasing and sintering to manufacture materials for ceramic ball of different Vickers hardness (Embodiments 8 to 11).

The materials for ceramic ball are for 5/16 inch use, and for all, $|r1-r2|$ being 60 $\mu m$, the height (H) of belt-like portion from spherical portion being 0.8 mm, the width (W) of the belt-like portion being 2 mm.

For comparison purpose with the aforementioned embodiments, materials for ceramic ball in which $|r1-r2|$ is changed to 110 $\mu m$ and Vickers hardness is varied similarly with the above embodiments are manufactured (Comparative Examples 8 to 11). In the comparative Examples, other than $|r1-r2|$ being 110 $\mu m$, the similar shape with the above embodiments is adopted.

Next, with the materials for ceramic ball each, similarly with Embodiment 1, the lapping is performed to confirm the durability of the abrasive grain. Further, bearing balls are manufactured in terms of the lapping and a rolling life test is carried out for each bearing ball.

The rolling life test is performed, with a thrust tester, by rotating on a counter member that is a plane table made of SUJ2 steel. The test is performed up to maximum 400 hours under the conditions of load of the maximum contact stress per ball of 5.9 GPa, a number of rotation of 1200 rpm and oil bath lubricant of turbine oil. The rolling life until a surface of each bearing ball peels off is measured. The respective test results are shown in Table 4. Of the test results of the rolling life in Table 4, ones that did not peel off for 400 hours or more are shown as having "good" rolling life and ones that peeled off at less than 400 hours are shown as having "bad" rolling life.

TABLE 4

| | Vickers hardness | Endurance times of abrasive grain | Rolling life |
|---|---|---|---|
| Embodiment 8 | 1100 | 20 | Bad |
| Embodiment 9 | 1400 | 16 | Good |
| Embodiment 10 | 1500 | 15 | Good |
| Embodiment 11 | 1600 | 14 | Good |
| Comparative Example 8 | 1100 | 10 | Bad |
| Comparative Example 9 | 1400 | 4 | Good |
| Comparative Example 10 | 1500 | 3 | Good |
| Comparative Example 11 | 1600 | 2 | Good |

As obvious from Table 4, when the Vickers hardness is 1400 or more, the present effect becomes further conspicuous.

Further, the materials for ceramic ball of Embodiment 8 and Comparative Example 8 both of which are low in Vickers hardness can realize 10 times or more of endurance times of the abrasive grain. However, these of which Vickers hardness is low are insufficient in the rolling life. Accordingly, it is difficult to apply in bearing balls or the like.

From the above, the material for ceramic ball of the present invention is effective in manufacturing ones of which hardness is particularly high and rolling life is necessary to be long.

In particular, the material for ceramic ball of the present invention is effective in manufacturing for instance bearing balls that are made of silicon nitride and have Vickers hardness of 1400 or more.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention includes all embodiments falling within the scope of the appended claims.

What is claimed is:

1. Material for ceramic ball, comprising:
   a spherical portion of approximate sphere formed at both end portions; and
   a belt-like portion formed at a center portion over an entire circumferential direction;
   wherein a difference between a diagonal diameter of the belt-like portion and a polar diameter of the spherical portion is 100 μm or less.

2. The material for ceramic ball as set forth in claim 1:
   wherein a height of the belt-like portion from the spherical portion is 1 mm or less.

3. The material for ceramic ball as set forth in claim 1:
   wherein a width of the belt-like portion is 5 mm or less.

4. The material for ceramic ball as set forth in claim 1:
   wherein the polar diameter of the spherical portion is 50 mm or less.

5. The material for ceramic ball as set forth in claim 1:
   wherein the material for ceramic ball is used as material for a bearing ball.

6. The material for ceramic ball as set forth in claim 1:
   wherein the material for ceramic ball essentially consists of silicon nitride.

7. The material for ceramic ball as set forth in claim 1:
   wherein Vickers hardness is 1400 or more.

8. Material for ceramic ball, comprising:
   a spherical portion of approximate sphere formed at both end portions; and
   a belt-like portion formed at a center portion over an entire circumferential direction;
   wherein a difference between a diagonal diameter of the belt-like portion and a polar diameter of the spherical portion is 100 μm or less;
   a height of the belt-like portion is 1 mm or less from the spherical portion; and
   a width of the belt-like portion is 5 mm or less.

9. The material for ceramic ball as set forth in claim 8:
   wherein the material for ceramic ball is used for material for a bearing ball.

10. The material for ceramic ball as set forth in claim 8:
    wherein the material for ceramic ball essentially consists of silicon nitride.

11. The material for ceramic ball as set forth in claim 8:
    wherein the material for ceramic ball has Vickers hardness of 1400 or more.

12. A method of manufacturing a ceramic ball, comprising the steps of:
    press molding ceramic powder to form a molded body having spherical portions of approximate sphere at both end portions and a belt-like portion at a center portion over an entire circumferential direction;
    sintering the molded body to manufacture material for ceramic ball of which difference between a diagonal diameter of the belt-like portion and a polar diameter of the spherical portion is 100 μm or less; and
    polishing the material for ceramic ball.

13. The method of manufacturing material for ceramic ball as set forth in claim 12:
    wherein the material for ceramic ball has a height of the belt-like portion of 1 mm or less from the spherical portion.

14. The method of manufacturing material for ceramic ball as set forth in claim 12:
    wherein a width of the belt-like portion of the material for ceramic ball is 5 mm or less.

15. The method of manufacturing material for ceramic ball as set forth in claim 12:
    wherein a polar diameter of the spherical portion of the material for ceramic ball is 50 mm or less.

16. The method of manufacturing material for ceramic ball as set forth in claim 12:
    wherein the ceramic powder essentially consists of silicon nitride.

17. The method of manufacturing material for ceramic ball as set forth in claim 12:
    wherein the material for ceramic ball has Vickers hardness of 1400 or more.

* * * * *